US008175803B2

(12) United States Patent
Caraballo

(10) Patent No.: US 8,175,803 B2
(45) Date of Patent: May 8, 2012

(54) GRAPHIC INTERFACE METHOD AND APPARATUS FOR NAVIGATION SYSTEM FOR PROVIDING PARKING INFORMATION

(75) Inventor: Orvill Caraballo, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 1181 days.

(21) Appl. No.: 11/999,595

(22) Filed: Dec. 6, 2007

(65) Prior Publication Data
US 2009/0150073 A1 Jun. 11, 2009

(51) Int. Cl.
*G08G 1/14* (2006.01)
*G01C 21/36* (2006.01)
*G08G 1/065* (2006.01)

(52) U.S. Cl. ........ 701/426; 701/423; 701/425; 701/439; 701/454; 701/487

(58) Field of Classification Search ............... 340/932.2; 701/209, 210, 400, 408, 409, 410, 423, 425, 701/426, 428, 429, 431, 435, 439, 450, 451, 701/454, 459, 465, 468, 487, 533
See application file for complete search history.

(56) References Cited

U.S. PATENT DOCUMENTS

| | | | | |
|---|---|---|---|---|
| 5,910,782 | A * | 6/1999 | Schmitt et al. | 340/995.12 |
| 7,516,010 | B1 * | 4/2009 | Kaplan et al. | 701/201 |
| 7,538,690 | B1 * | 5/2009 | Kaplan et al. | 340/932.2 |
| 7,893,847 | B2 * | 2/2011 | Shanbhag et al. | 340/932.2 |
| 2002/0161520 | A1 * | 10/2002 | Dutta et al. | 701/213 |
| 2003/0090393 | A1 * | 5/2003 | Andersson et al. | 340/995.24 |
| 2004/0032342 | A1 * | 2/2004 | Dunning | 340/932.2 |
| 2004/0236615 | A1 * | 11/2004 | Msndy | 705/5 |
| 2004/0254840 | A1 * | 12/2004 | Slemmer et al. | 705/22 |
| 2005/0168352 | A1 * | 8/2005 | Tomer | 340/932.2 |
| 2005/0286421 | A1 * | 12/2005 | Janacek | 370/231 |
| 2006/0139182 | A1 * | 6/2006 | Staniszewski | 340/932.2 |
| 2006/0255119 | A1 * | 11/2006 | Marchasin et al. | 235/375 |
| 2007/0008181 | A1 * | 1/2007 | Rollert et al. | 340/932.2 |
| 2007/0040701 | A1 * | 2/2007 | Browne et al. | 340/932.2 |
| 2007/0188349 | A1 * | 8/2007 | Staniszewski | 340/932.2 |
| 2010/0017118 | A1 * | 1/2010 | Dougherty | 701/209 |

FOREIGN PATENT DOCUMENTS

| | | |
|---|---|---|
| JP | 2006-214853 | 8/2006 |
| JP | 2006-337172 | 12/2006 |

* cited by examiner

*Primary Examiner* — Khoi Tran
*Assistant Examiner* — Dale Moyer
(74) *Attorney, Agent, or Firm* — Muramatsu & Associates

(57) ABSTRACT

A graphic user interface method and apparatus for a navigation system graphically shows parking information which vary depending on conditions such as time ranges or days, etc. The method includes the steps of: examining a location specified by a user for retrieving data associated with the specified location from data storage medium; displaying a screen of parking information graphic interface upon request by the user; and examining whether there is a time-related parking restriction on the specified location and retrieving the time-related parking information if any. The parking information graphic interface illustrates a map image, a time table of a day, a time range indicator on the time table, and a text message regarding the time-related parking restriction, thereby graphically displaying the parking information on the specified location.

18 Claims, 15 Drawing Sheets

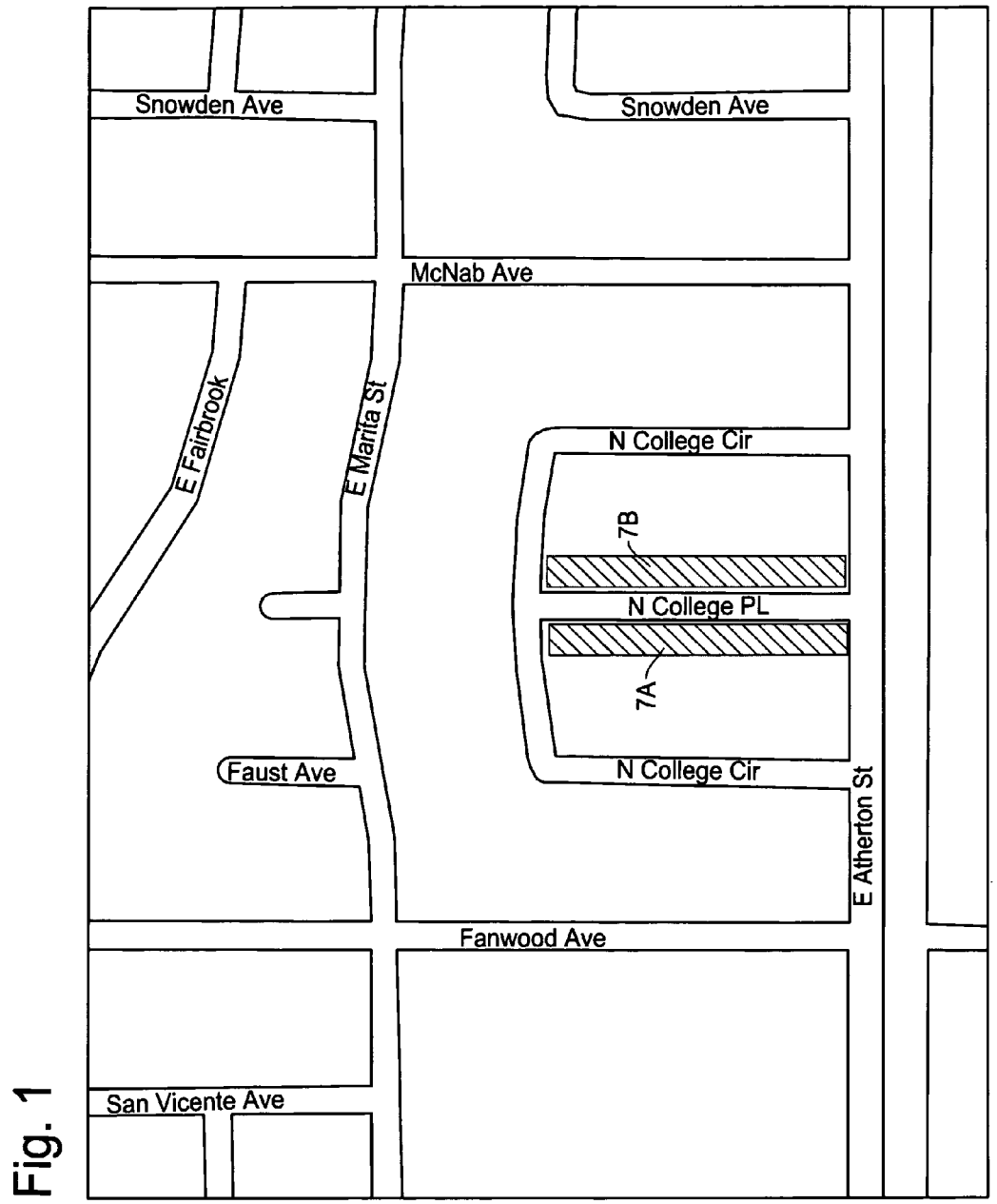

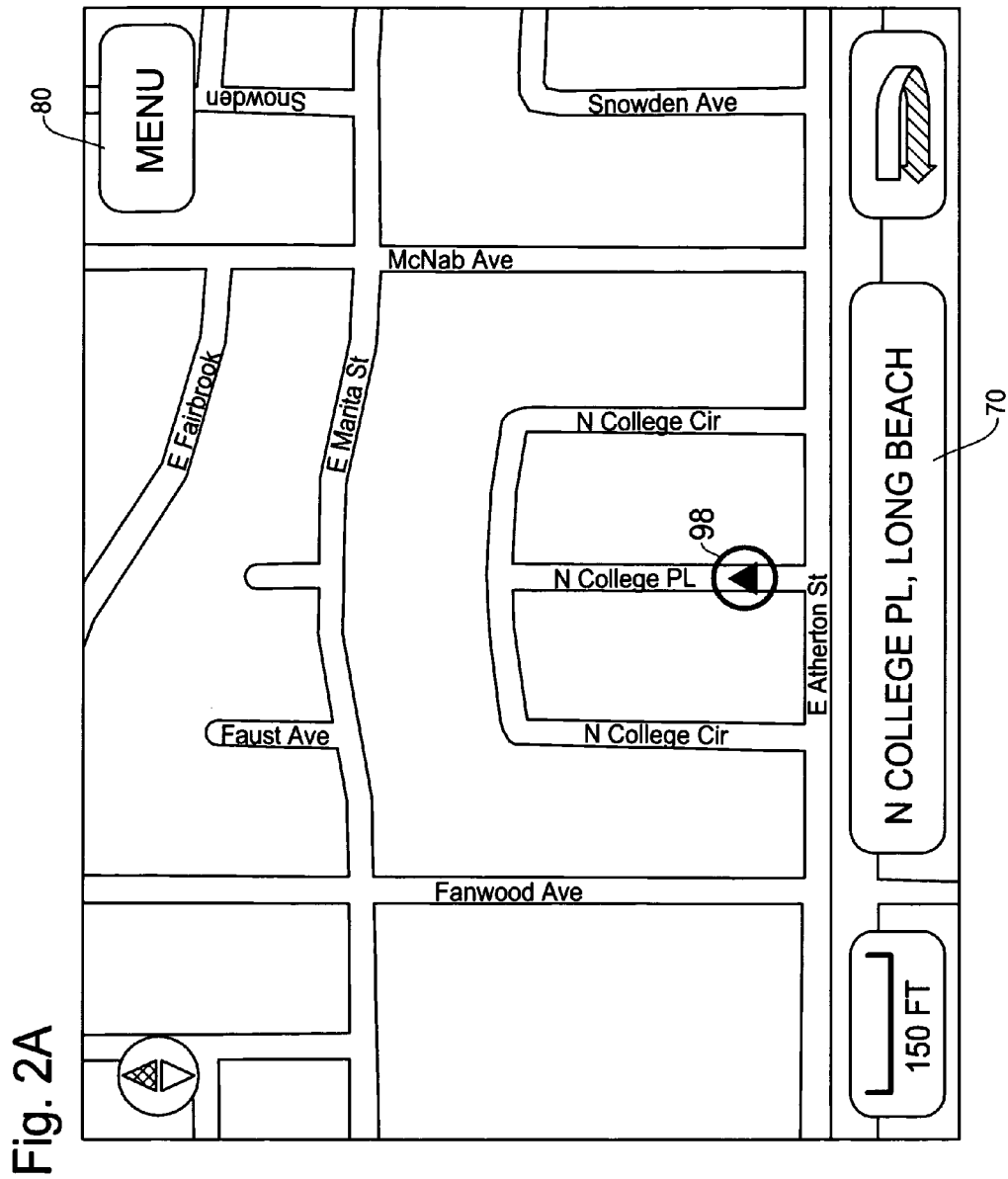

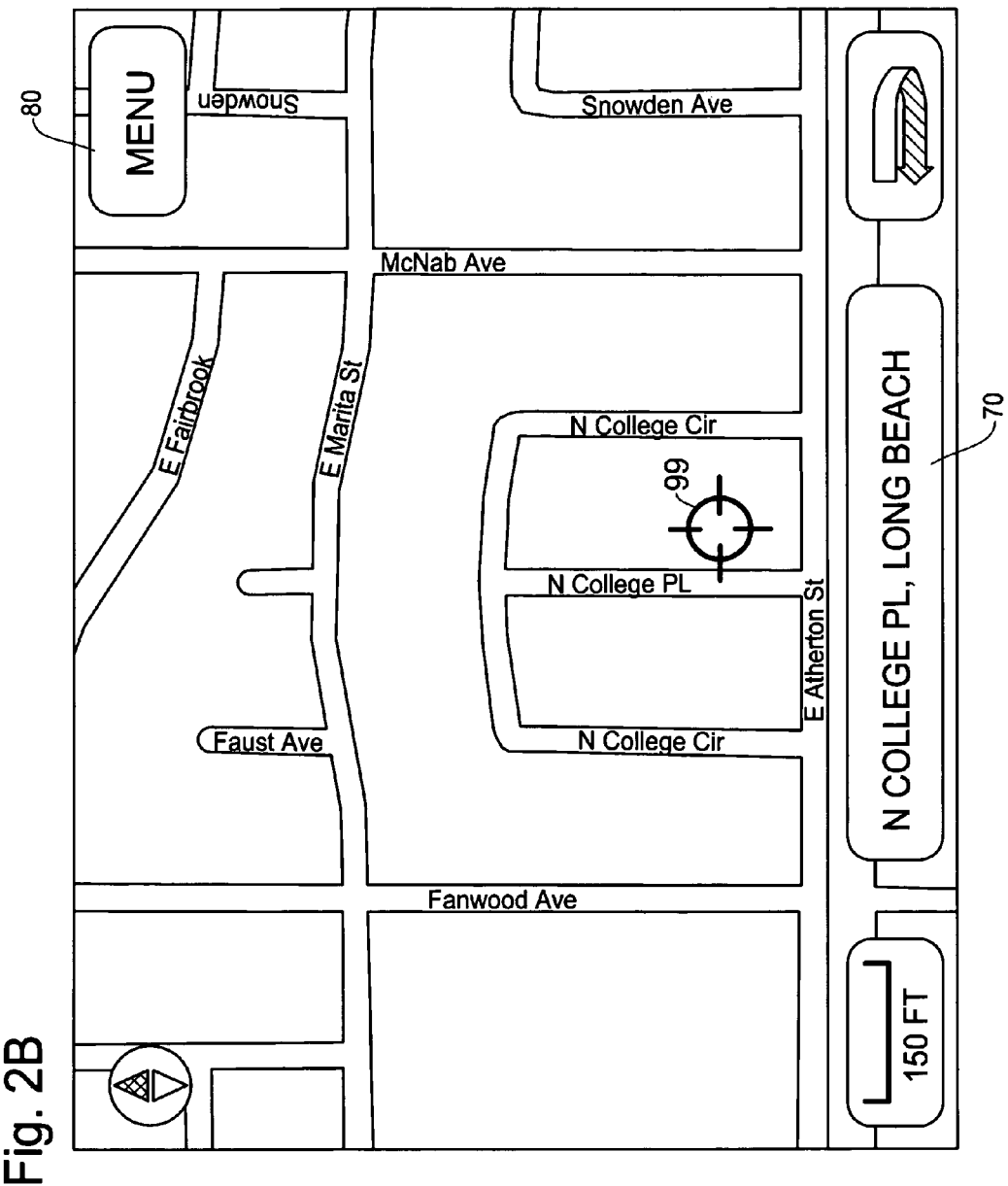

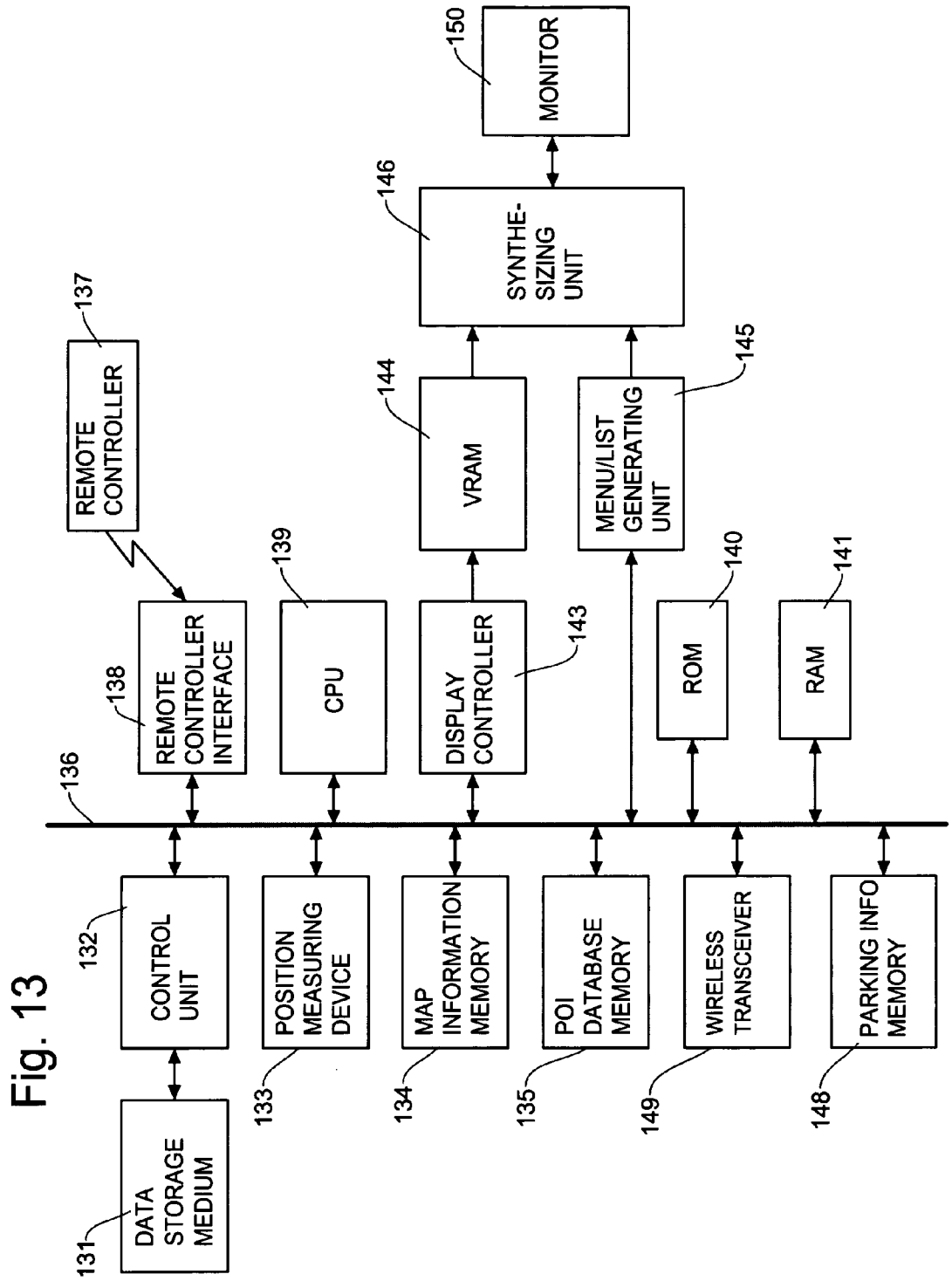

GRAPHIC INTERFACE METHOD AND APPARATUS FOR NAVIGATION SYSTEM FOR PROVIDING PARKING INFORMATION

FIELD OF THE INVENTION

This invention relates generally to a user interface method and apparatus for a navigation system, and more particularly, to a graphic user interface method and apparatus for a navigation system that graphically shows parking information which vary depending on conditions such as time ranges or days, etc.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. Such a navigation system detects the position of the user's vehicle, and reads out map data pertaining to an area at the current vehicle position from a data storage medium, for example, a CD-ROM (compact disc read-only memory), a DVD (digital versatile disc), or a hard disc. Typically, the navigation system displays a map image on a monitor screen while superimposing thereon a mark representing the current location of the user. At an intersection, if a turn is necessary, the navigation system notifies the user which direction to turn at the intersection.

The navigation system continues route guidance to the selected destination until the user reaches the destination or the user manually disables the route guidance operation. During the route guidance operation, the navigation system constantly checks if the address of the destination is within a predetermined arrival detection range, for example, a 200-300 feet radius from the vehicle position. When the vehicle reaches a point where the address point of the specified destination comes within the arrival detection range, the navigation system determines the arrival and announces that the user has arrived at the destination.

When the user attempts to find a parking space at the destination, the user may face a problem that a particular parking space has special regulations that vary depending on times and days. For example, a certain portion of a parking area may not be available during a certain time range in the morning such as between 6 AM and 10 AM, or a particular parking area may have parking restrictions on weekends, etc. The problems described above can become further complicated and troublesome when the parking restrictions will change depending upon which side of a particular road will be used as a parking space.

FIG. 1 is a schematic diagram showing an example of road having parking spaces associated with parking restrictions that include the differences upon which road side is used as a parking space. In this example, parking spaces 7A and 7B are allocated along the street of "N. College PL". In FIG. 1, the parking space 7A is on the left side of the street "N. College PL", while the parking space 7B is on the right side of the street "N. College PL". The parking restrictions can change depending on which times of a day and which days of a week as well as which side of the street, i.e., either the parking space 7A or the parking space 7B.

For example, in FIG. 1, parking in the parking space 7A may be prohibited during commuting hours such as between 6 AM and 10 AM while parking in the parking space 7B may be allowed during such commuting hours only for particular type of vehicles such as vehicles of hybrid engines. In another example, parking in the parking space 7A may be allowed during the weekends while parking in the parking space 7B may be prohibited throughout the weekends. Thus, the parking restriction can be frustrating to the driver who usually has to find out about such parking restrictions after reaching the parking area at the destination.

Thus, there is a need of a new method and apparatus for a navigation system to obtain detailed parking information in advance so that the user can be well informed about the parking spaces before reaching the destination. There is also a need that the parking information be presented in an organized and intuitive manner through a graphic interface on a screen of a navigation system to facilitate easy understanding of the relevant information.

SUMMARY OF THE INVENTION

It is, therefore, an object of the present invention to provide a graphic user interface method and apparatus for a navigation system which is able to providing parking information at a destination in a user friendly manner before reaching the destination.

It is another object of the present invention to provide a parking information graphic interface method and apparatus for a navigation system which is able to providing parking information at a destination or other specified location by means of a specially designed display arrangement including a street map, a time table, a time range indicator, etc.

It is a further object of the present invention to provide a parking information graphic interface method and apparatus which is able to providing parking information at a destination or other selected location with use of various selection keys and messages where colors and patterns thereof are coordinated with one another.

One aspect of the present invention is a parking information graphic interface method for a navigation system to provide parking information concerning a destination or other selected location. The method includes the steps of: examining a location specified by a user for retrieving data associated with the specified location from data storage medium; displaying a screen of parking information graphic interface upon request by the user; and examining whether there is a time-related parking restriction on the specified location and retrieving the time-related parking information if any. The parking information graphic interface illustrates a map image, a time table of a day, a time range indicator on the time table, and a text message regarding the time-related parking restriction, thereby graphically displaying the parking information on the specified location.

In the parking information graphic interface method of the present invention, the text message regarding the time-related parking restriction is identified by an icon where a color or pattern of the icon is coordinated with that of the time range indicator. Further, two or more time range indicators are displayed on the time table when there are two or more time-related parking restrictions to indicate time lengths that the corresponding parking restrictions apply, and two or more text messages regarding the corresponding time-related parking restrictions are identified by two more icons where colors or patterns of the icons are coordinated with those of the time range indicators.

In the parking information graphic interface method of the present invention, the parking information graphic interface further illustrates selection keys thereon to prompt the user to select a desired day of a week to display the parking information on the specified location regarding the selected day.

Further, the parking information graphic interface further illustrates road side selection keys thereon to prompt the user to select a desired road side to display the parking information on the specified location regarding the selected road side.

In the parking information graphic interface method as of the present invention, the map image on the parking information graphic interface covers an area including the specified location on which a parking area at the specified location or a parking area on the selected road side at the specified location is highlighted.

In the parking information graphic interface method of the present invention noted above, the specified location is either a destination of travel, a current position of a vehicle of the user, or any position on the map image specified by a cursor point.

In the parking information graphic interface method of the present invention, the text message on the parking information graphic interface indicates that there is no parking restriction when there is no time-related parking restriction regarding the specified location.

In the parking information graphic interface method of the present invention, the parking information graphic interface further illustrates a parking button thereon to find parking areas close to the specified location when the user activates the parking button. Further, the parking information graphic interface displays a list of parking areas close to the specified location when the user activates the parking button where the parking areas are listed in an order of distance from the specified location, an order of alphabet, or an order of price range.

Another aspect of the present invention is a user interface apparatus for graphically showing parking information for implementing the steps defined in the methods of the present invention noted above. The apparatus includes various means to examine the parking information related to the destination or any specified location and to display the parking information through the specifically designed user interface. The parking information graphic user interface is able to provide the parking information in an easily and intuitively understandable manner.

According to the present invention, the navigation system is able to efficiently and intuitively provide parking information to the user through the parking information graphic user interface. The parking information graphic user interface includes a time table with a time range indicator, text messages, road side selection keys, days of week keys, etc., where colors and patterns used in the user interface are coordinated with one another so that the parking information is displayed in an easily and intuitively understandable manner. Since the user is able to obtain the detailed parking information in advance, the user can be well informed about the parking spaces before reaching the destination. Further, since the user is able to obtain the detailed parking information at any specified location at any time, the user can have sufficient knowledge and select a desired parking location and parking time.

BRIEF DESCRIPTION OF THE DRAWINGS

FIG. 1 is a schematic diagram showing an example of map image involving a situation where parking spaces are located along both sides of a street.

FIGS. 2A and 2B show examples of screen of the navigation system that will be typically displayed when starting the parking information graphic interface for implementing the present invention where a map image is displayed along with various function keys of the navigation system.

FIG. 13 is a block diagram showing an example of configuration of a vehicle navigation system implementing the parking information graphic user interface apparatus of the present invention.

DETAILED DESCRIPTION OF THE PREFERRED EMBODIMENT

The method and apparatus of parking information graphic user interface for a navigation system is explained in detail with reference to the accompanied drawings. In the following, the description will be made mainly for the case where the parking information graphic interface method and apparatus is applied to a vehicle navigation system. However, the method and apparatus for graphically showing the parking information under the present invention can be implemented to other devices having a navigation function to determine a calculated route to the destination, such as portable navigation devices, PDAs, cellular phones, wrist watches, personal computers, etc.

The method and apparatus of the present invention provides an efficient and intuitive way of displaying the parking information concerning the destination or other selected location in advance or any time such information is necessary. As noted above, when the user attempts to find a parking space at the destination, there arises a problem that a particular parking space has special regulations that vary depending on times and days. The problems described above can become further complicated and troublesome when the parking restrictions will change depending upon which side of a particular road will be used as a parking space.

The graphic interface method and apparatus of the present invention enables to efficiently and intuitively display the parking information on the screen of the navigation system. On the screen of the navigation system, the graphic user interface shows the parking information at the destination or any selected location in combination with a map image, specially designed function keys, a time table and scale, menus, etc., in an easily understandable manner. In the present invention, since the user is able to obtain the detailed parking information in advance, the user can be well informed about the parking spaces before reaching the destination.

FIGS. 2A and 2B show examples of screen of the navigation system that will be typically displayed when starting the parking information graphic interface for implementing the present invention. The navigation system is either in the route guidance operation or in the map view mode and displays a map image along with function keys. In FIG. 2A, a vehicle location mark 98 indicates a current position of a vehicle (user) which will change dynamically as the vehicle moves, which is typically a situation where the user wants to check the parking information around his current location. Alternatively, in FIG. 2B, a cursor 99 is used to select any desired location on the map image, for example, the destination not reached yet or any location unrelated to the destination. This is typically a situation where the user wants to check the parking information around the area pointed by the cursor 99 without regard to the current vehicle position or destination.

Figure 3:
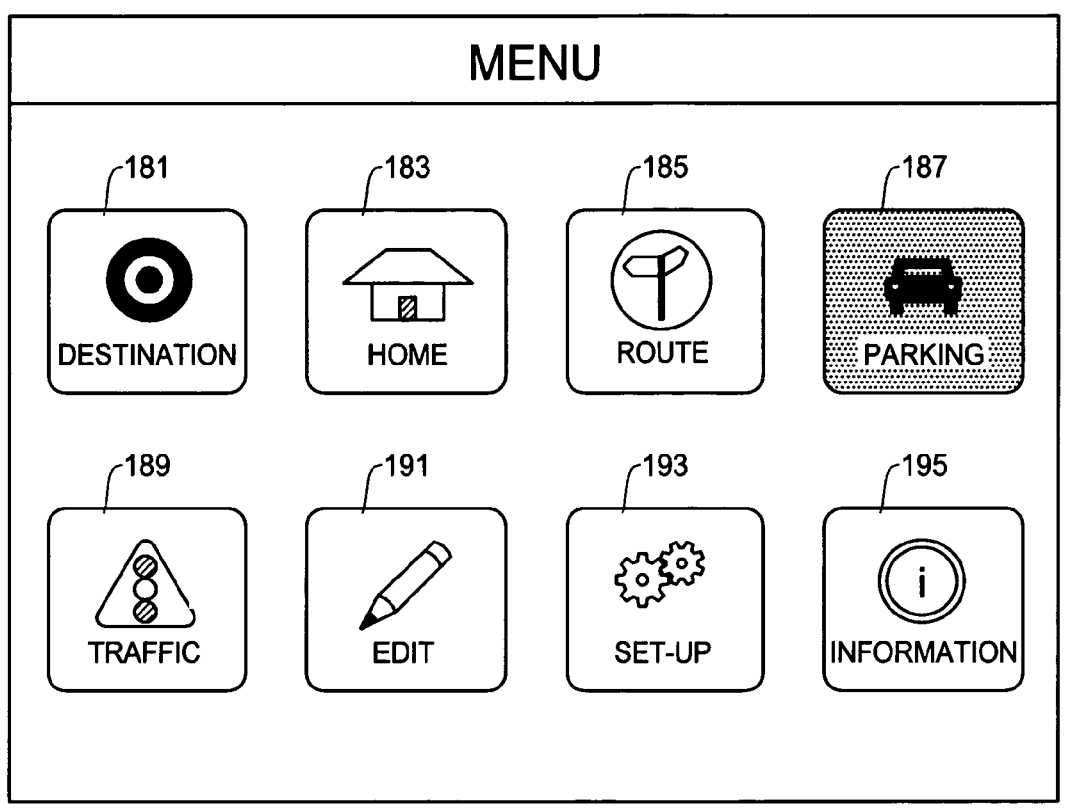
FIG. 3 is a schematic diagram showing an example of menu displayed on the navigation system of the present invention whereby the user selects a menu to obtain parking information at the destination.

A menu button 80 is shown on the screen which is used to display a main menu screen as shown in FIG. 3 through which the user can activate the parking information graphic interface. Other relevant information, such as a map scale, a current road name in a text window 70, and a direction indicator (compass) are displayed as well. When the user wants to retrieve the parking information concerning the current position indicated by the current position mark 98 or any desired location selected by the cursor 99, the user presses the menu key 80.

Then, the navigation system shows the main menu screen as in a manner shown in FIG. 3, which is typically displayed at the start of the operation of the navigation system. In the example of FIG. 3, the menu screen includes several menu buttons from which the user is able to select a desired action. Specifically, the menu screen shows various menu keys including a destination key 181 for specifying a destination, a home key 183 for storing a home address, a route key 185 for displaying a simulated route to the destination, a parking key 187 for obtaining parking information which is directed to the present invention. Other menu keys are also displayed which include a traffic key 189, an edit key 191, a set-up key 193, and an information key 195, as known in the art.

When the user activates the parking information graphic interface by pressing the parking key 187 on the menu screen of FIG. 3, the navigation system shows the screens of FIGS. 4-8 for implementing the parking information graphic user interface of the present invention. The parking information graphic user interface of FIGS. 4-8 shows a street map 21, a menu button 80, a parking time table 81, a current street indicator 82, a parking information window 83, a parking button 84, direction arrow keys 85, street side keys 86 and 87, days of week key 88, and a current time and day indicator 89.

The street map 21 shows the map image of the pertinent area to graphically show streets and locations of parking space on the map image. Here, the pertinent area is typically an area surrounding the current vehicle (user) position indicated by the current position mark 98 or an area specified by a cursor 99. The current street indicator 82 on the upper right of the screen (interface) indicates the name of the street specified by the current position mark 98 or the cursor 99.

The parking information window 83 shows the parking information of the pertinent parking area typically by a combination of text messages and one or more icons. In this example, the parking information window 83 includes a text message 91A indicating "Street Sweeping" and an icon 91B with a predefined color or pattern. The color or pattern of the icon 91B corresponds to that of a time range indicator 45 shown on the parking time table 81 for indicating a time range of a day that the parking information expressed by the text message is applicable.

Figure 4:
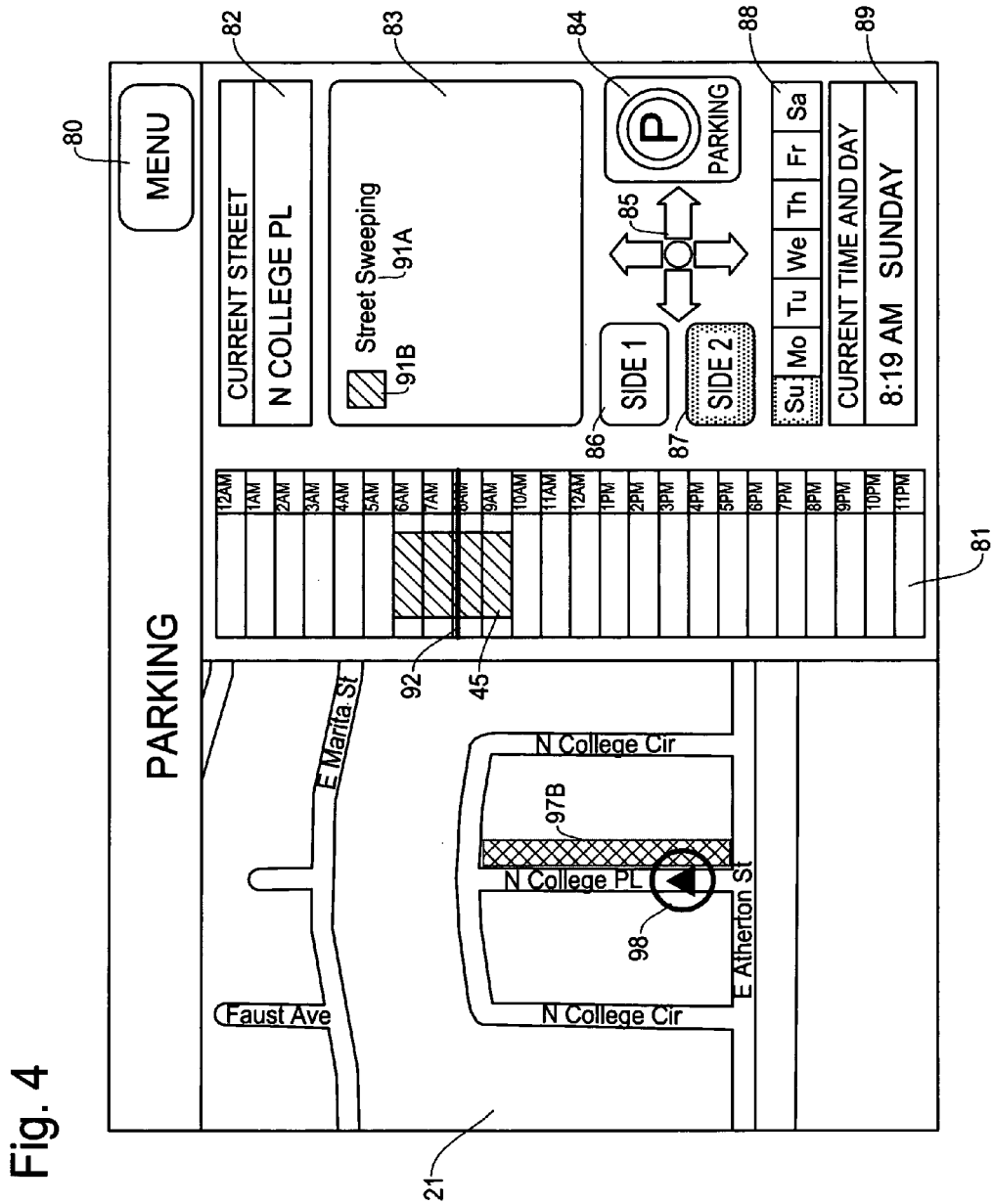
FIG. 4 is a display example of the navigation system of the present invention where the parking information is displayed with respect to the right (second) side parking area of a particular street on Sunday.
Figure 9A:
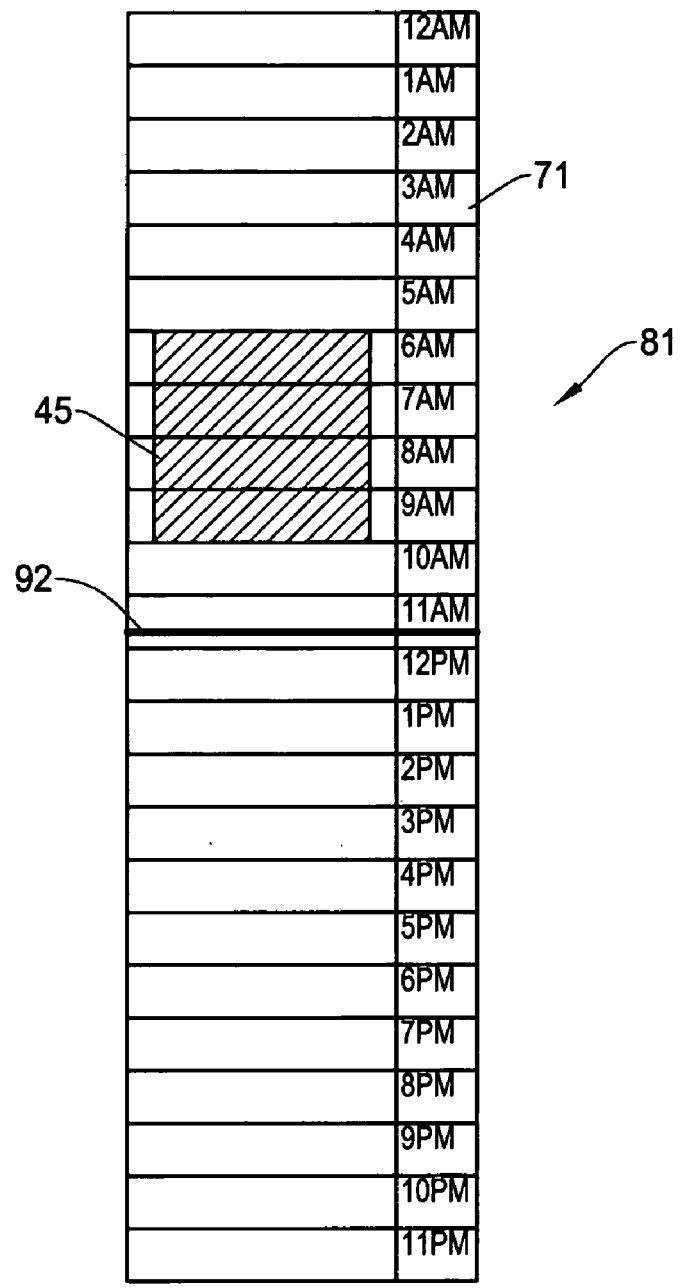
FIGS. 9A and 9B are schematic diagrams showing enlarged view of time tables used in the parking information graphic interface of FIGS. 4-8 displayed on the navigation system of the present invention.

The parking time table 81 in FIG. 4 shows time slots of twenty four (24) hours, the details of which are described by an enlarged view of FIG. 9A. In the parking time table 81 of FIG. 9A, a current time bar 92 shows the current time and time slot indicators 71 show the time at each time slot. As noted above, the time range indicator 45 is used to graphically represent an applicable time range that the text information, in this case, the "Street Sweeping" is in effect on the parking area indicated in the street map 21. As noted above, the color or pattern of the time range indicator 45 is designed to be identical to that of the corresponding icon 91B, for instance, if the color of the icon 91B is red, the time range indicator 45 is red as well.

Further in FIG. 4, the street side keys 86 and 87 are used to switch between the road sides if a particular street has parking areas at both sides. As described with reference to FIG. 1, as indicated by the parking areas 7A and 7B located along the street "N College PL", there are cases where the parking restrictions differ depending on which road side of the parking area. The street side keys 86 and 87 are used to select one of the sides of the street to check the parking information on each side.

In the example of FIG. 4, the street side key 87 representing the side 2 is pressed, which corresponds to the parking area 97B highlighted in the street map 21. Preferably, the navigation system automatically sets the side 2 (parking area 97B) by default since it is the closest side of the vehicle when the vehicle moves to the north along the street "N College PL" as the user drives the right side of the street. Alternatively, when the cursor 99 (FIG. 2B) is used, the navigation system may select the side that is closer to the cursor point.

The direction arrow keys 85 are used for scrolling the map image on the street map 21. The parking button 84 is used to display a list of parking areas within a certain distance range from the current vehicle location or other location specified by the user as will be described in detail later with reference to FIG. 10. The days of week keys 88 show days of a week, from Sunday to Saturday so that the user is able to select one of the days to see whether there is any difference in the parking restrictions depending on the days of the week.

In the example of FIG. 4, Sunday is selected and thus, the "Sunday" key is highlighted. When the user presses the street side key 86, which represents the side 1, the navigation system will display the parking information for the parking at the road side 1. The current time and day indicator 89 at the lower right of the screen indicates day (Sunday) and the current time (8:19 AM) which corresponds to the time bar 92 on the parking time table 81. Thus, according to the parking information shown in the interface of FIG. 4, in the parking area 97B which is on the side 2 of the street "N College PL", parking is not allowed between 6 AM and 10 AM on Sunday.

Figure 5:
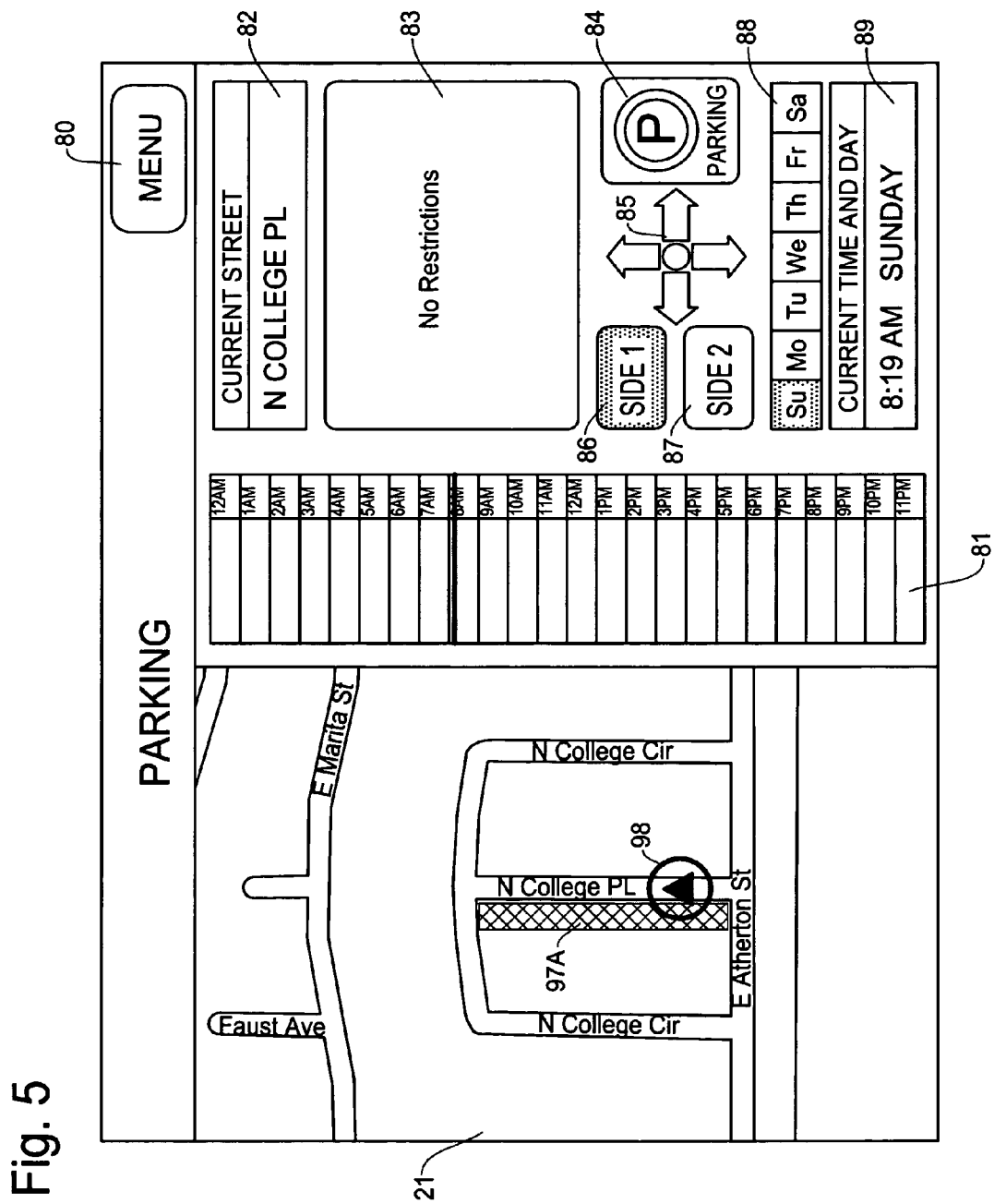
FIG. 5 is a display example of the navigation system of the present invention where the parking information is displayed with respect to the left (first) side parking area along the same street as that of FIG. 4 on Sunday.

FIG. 5 is another example of display of the parking information graphic interface which shows the parking information regarding the side 1, i.e., the parking area 97A shown in the street map 21. In this case, the parking information window 83 indicates "No Restrictions" and the parking time table 81 does not have any time range indicator. Although the days of week keys 88 highlights "Sunday", the user can press other keys to select other days to see the parking information on a different day of the week. Thus, according to the parking information shown in FIG. 5, in the parking area 97A which is on the side 1 of the street "N College PL", parking is allowed anytime on Sunday.

Figure 6:
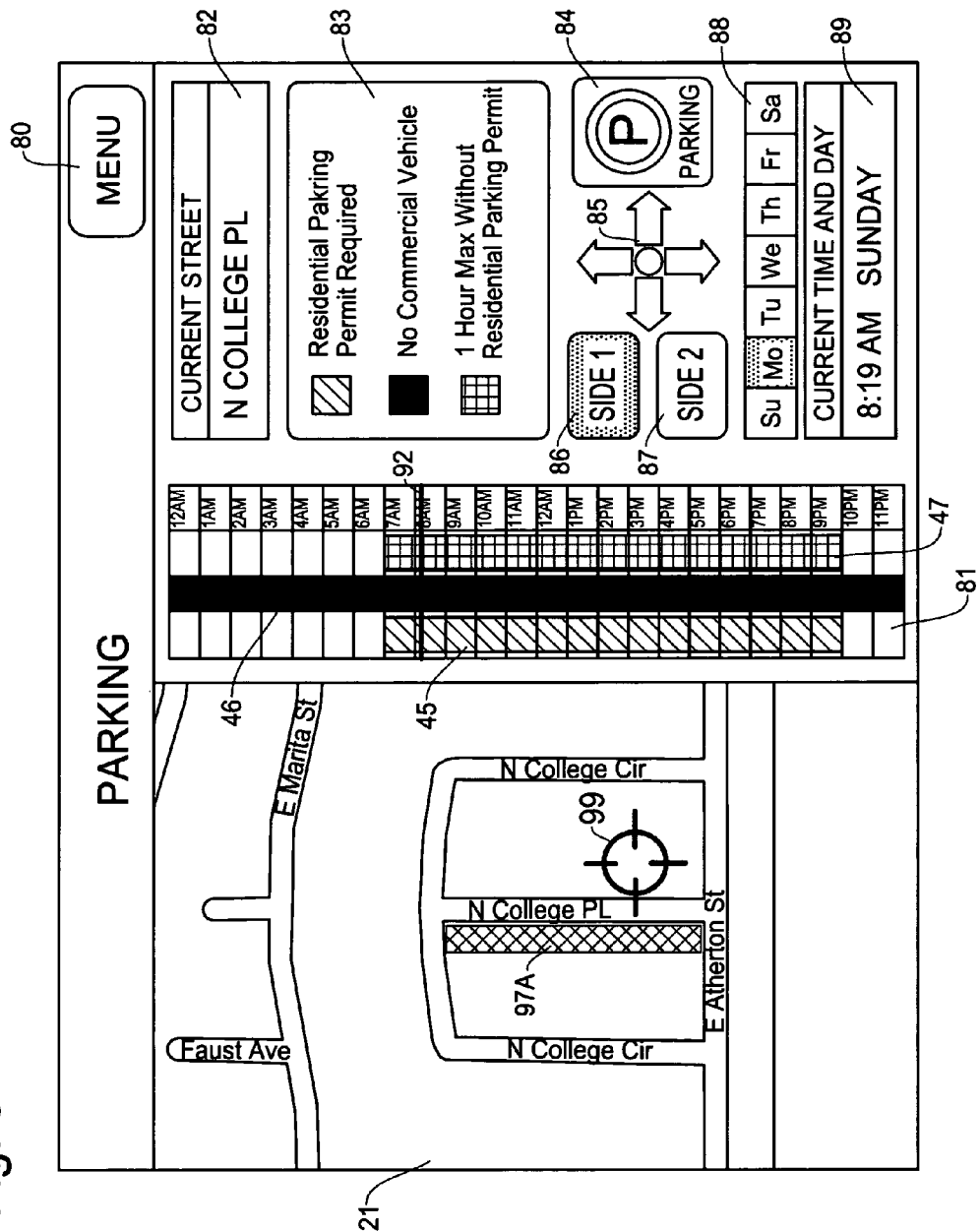
FIG. 6 is a display example of the navigation system of the present invention where the parking information is displayed with respect to the left (first) side parking area along the same street as that of FIG. 4 on Monday.

FIG. 6 is a further example of display of the parking information graphic interface which shows the parking information regarding the side 1, i.e., the parking area 97A shown in the street map 21. In this example, unlike the example of FIG. 5, the user has pressed the button representing Monday in the days of week keys 88, thus, the key indicating Monday is highlighted. Also in this example, the cursor 99 points the "N College PL" street on the map image rather than the current position mark, thereby obtaining the parking information by simply pointing the cursor to the pertinent area on the map image.

In this example, the data on the parking time table 81 and the parking information window 83 on the parking information graphic user interface are more complicated than that of the previous examples. However, due to the logical and graphic presentation of the parking information graphic interface implemented in the present invention, the user is able to comprehend the information with ease. The parking information window 83 lists three entries, namely, "Residential Parking Permit Required", "No commercial Vehicle", and "1 Hour Max Without Residential Parking Permit" as text messages.

Figure 9B:
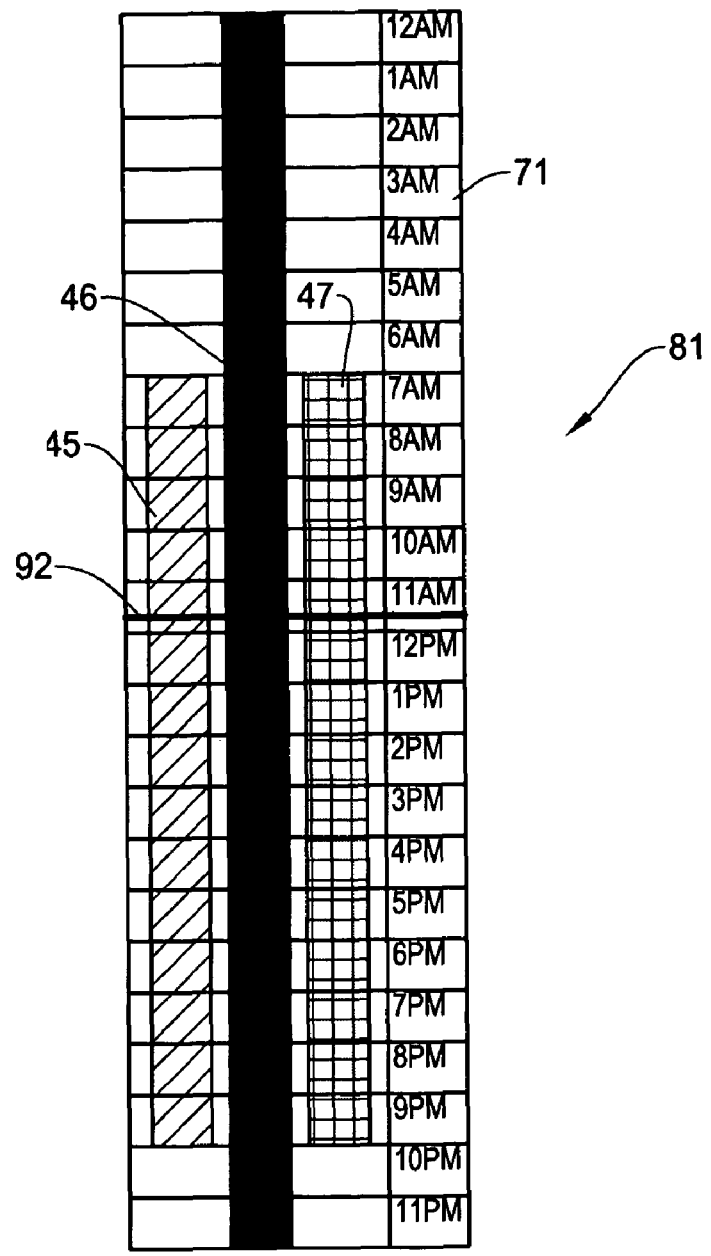

Next to each entry (text message) is an icon which is specified either by color or pattern, etc., which corresponds to the color or pattern of the time range indicators on the parking time table 81. Namely, the parking time table 81 of FIG. 6 includes three time range indicators 45, 46 and 47 that correspond to the respective messages and icons in the parking information window 83. The parking time table 81 in FIG. 6 shows time slots of twenty four (24) hours, the details of which are shown by an enlarged view of FIG. 9B which includes a current time bar 92, time range indicators 45, 46 and 47, and time slot indicators 71.

Each of the time range indicators 45-47 has its unique color or pattern that matches with the color or pattern of the icon that accompanies the text message in the parking information window 83. The color or pattern of the time range indicators 45-47 may be used consistently to help the user to identify the kind or type of parking restriction. For example, the navigation system may use the color of red to indicate the restriction "No parking" (parking is prohibited), while the navigation system may use the color of yellow to indicate the parking limitation by time ranges (ex. 2 hour maximum).

In the example of FIG. 6, the parking information for the parking area 97A on Monday indicates that parking of commercial vehicle is not allowed throughout the day. The parking information also indicates that parking is allowed during 7 AM to 10 PM for non-commercial vehicles that have residential parking permits. Further, parking of less than one hour is allowed for non-commercial vehicles that do not have residential parking permits.

Figure 7:
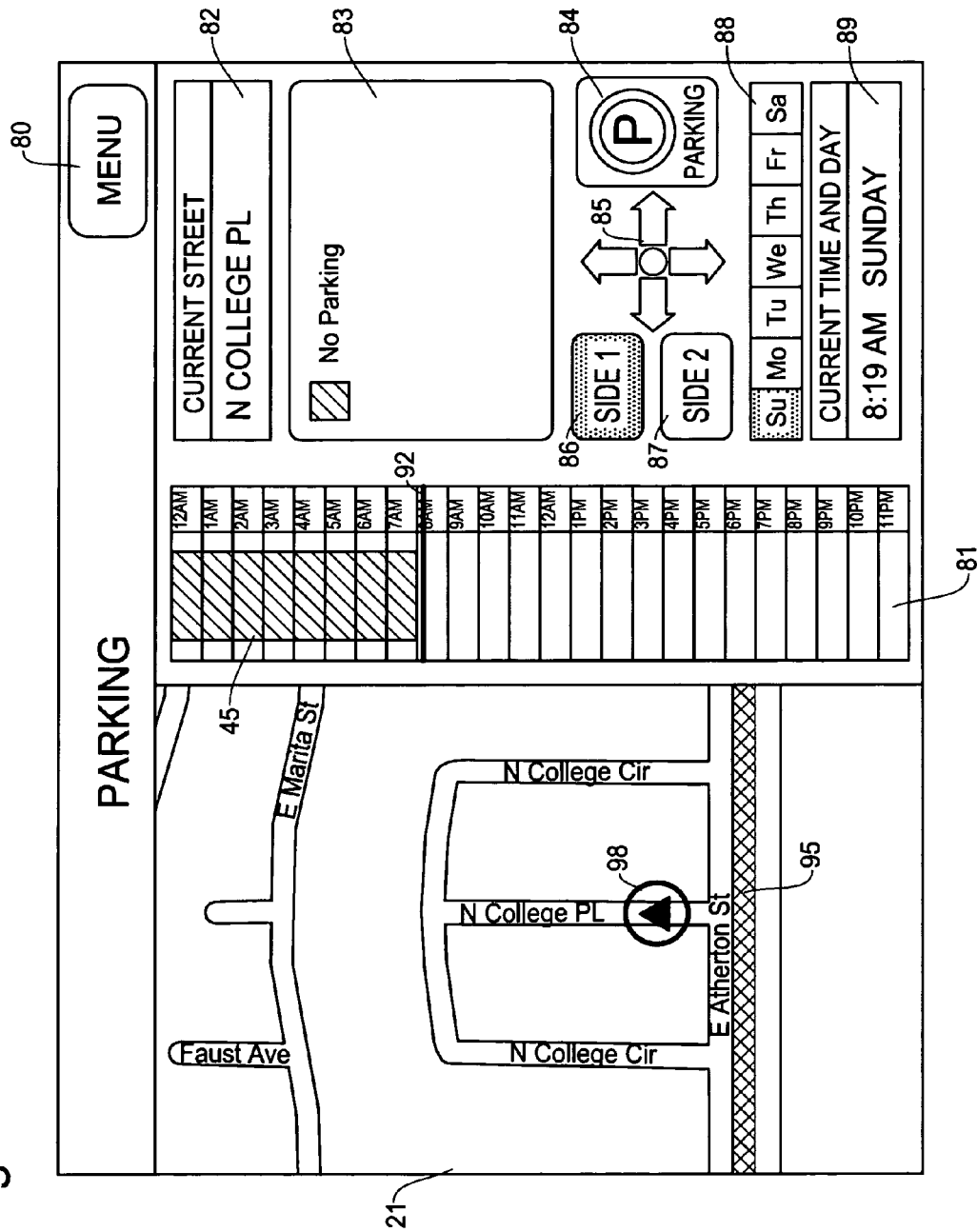
FIG. 7 is a display example of the navigation system of the present invention where the parking information is displayed with respect to a parking space along another street on Sunday.

FIG. 7 is a further example of display of the parking information graphic interface which shows the parking information regarding a parking area 95 along a road of "E Atherton St". In this example, unlike the example of FIGS. 4 and 5, the street "E Atherton St" has the parking area 95 only on its one side, thus, the street side key 86 (side 1) is highlighted in default. In this example of FIG. 7, the user has pressed the key representing Sunday in the days of week keys 88 to obtain the parking information concerning the parking area 95 on Sunday.

Consequently, through the parking information graphic user interface, the navigation system shows the parking information regarding the parking area 95 at the road side of "E Atherton St". Similar to the previous examples, the parking information window 83 has a parking information entry with an icon, and the parking time table 81 has a corresponding time range indicator 45. In this example, the parking information indicates that parking is not allowed in the parking area 95 between the time range of 12 AM and 8 AM on Sunday. As noted above, although the current position mark 98 is shown, the user is able to specify the parking area by pointing the cursor 99 without need of actually arriving at the parking area 95.

Figure 8:
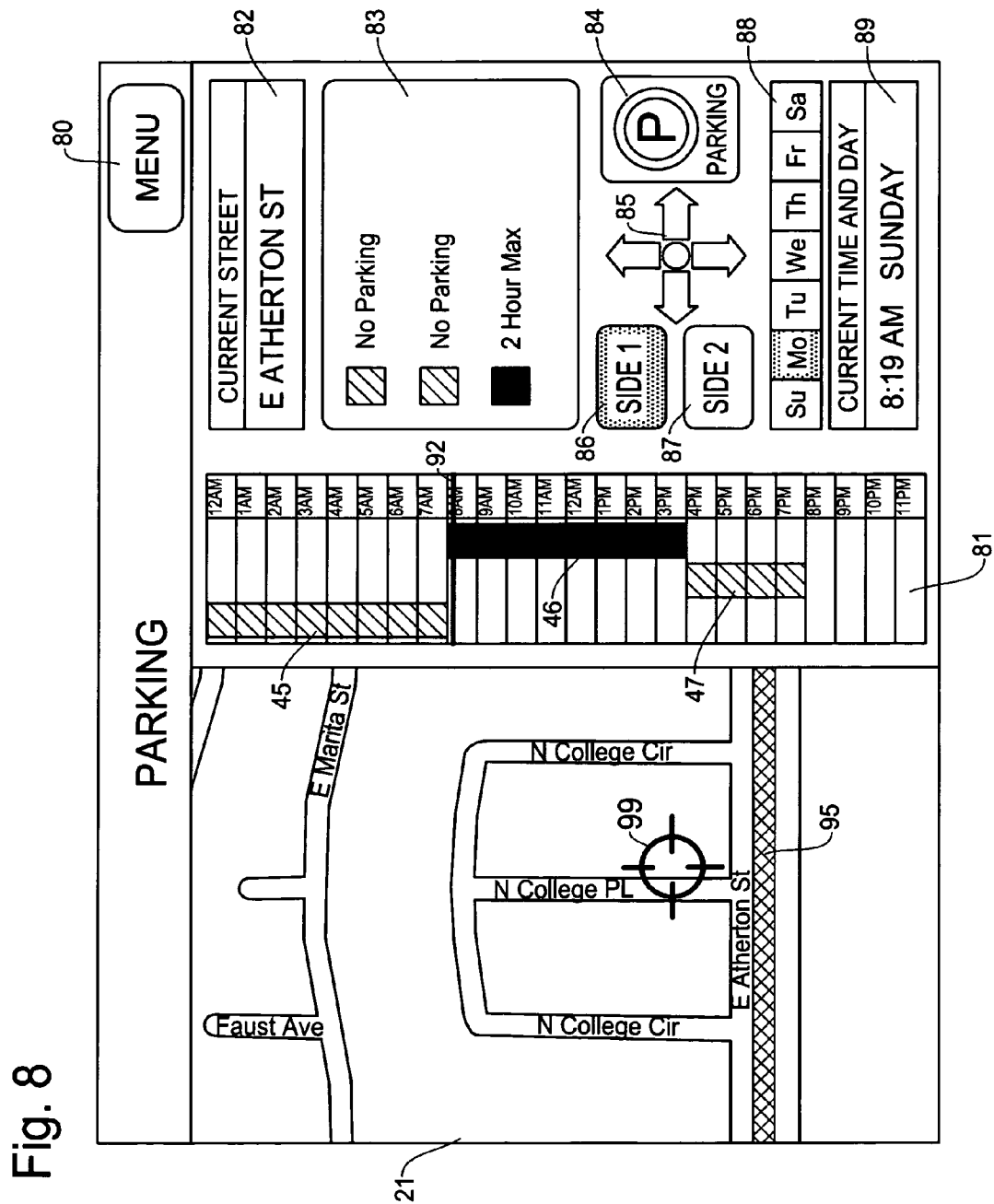
FIG. 8 is a display example of the navigation system of the where the parking information is displayed with respect to a parking side along the same street as that of FIG. 7 on Monday.

FIG. 8 is a further example of display of the parking information graphic interface which shows the parking information regarding the parking area 95 along the road of "E Atherton St". Unlike the example of FIG. 7, this example shows the situation where the Monday key from the days of week keys 88 has been selected and highlighted. In this example, three parking information entries are listed in the parking information window 83 and the corresponding time range indicators 45-47 are arranged in the parking time table 81 with the same colors or patterns.

The user may change the day of the week to any other day, such as Wednesday or Thursday to see parking information for the selected day. The user may also change the side of the street by pressing the street side keys 86 or 87 if there are parking areas at both sides of the street. In this example, the parking information for the parking area 95 on Monday indicates that parking is not allowed between the time range of 12 AM and 8 AM and between the time range of 4 PM to 8 PM, and parking of less than two hours is allowed between the time range of 8 AM to 4 PM.

As noted above, FIGS. 9A and 9B are enlarged views of the parking time table 81 used in the parking information graphic user interface of the present invention. The parking time table 81 of FIG. 9A corresponds to that of FIG. 4 and the time table 81 of FIG. 9B corresponds to that of FIG. 6. As shown, the parking time table 81 has time slot indicator 71 that lists the times from 12 AM to midnight. The current time bar 92 indicates the current time on the parking time table 81, and its position changes dynamically as the time passes.

The color or pattern of the time range indicator 45 corresponds to that of the icon 91B in the parking information window 83 of FIG. 4. The colors or patterns of the time range indicators 45-47 correspond to that of the icons in the parking information window 83 of FIG. 6. The time range indicators 45-47 are used to graphically represent the time range that the parking information expressed by the text massages are in effect.

Although the time slot indicator 71 lists 24 hours of a day, the parking time table 81 is not limited to this configuration. In order to show the time slot indicator 71 more clearly, an image of the parking time table 81 may be enlarged and the interface has scroll keys to enable the user to scroll the parking time table 81 so that the time table 81 does not have to list all 24 hours on one screen. Moreover, the parking time table 81 may also be arranged horizontally rather than vertically.

Figure 10:
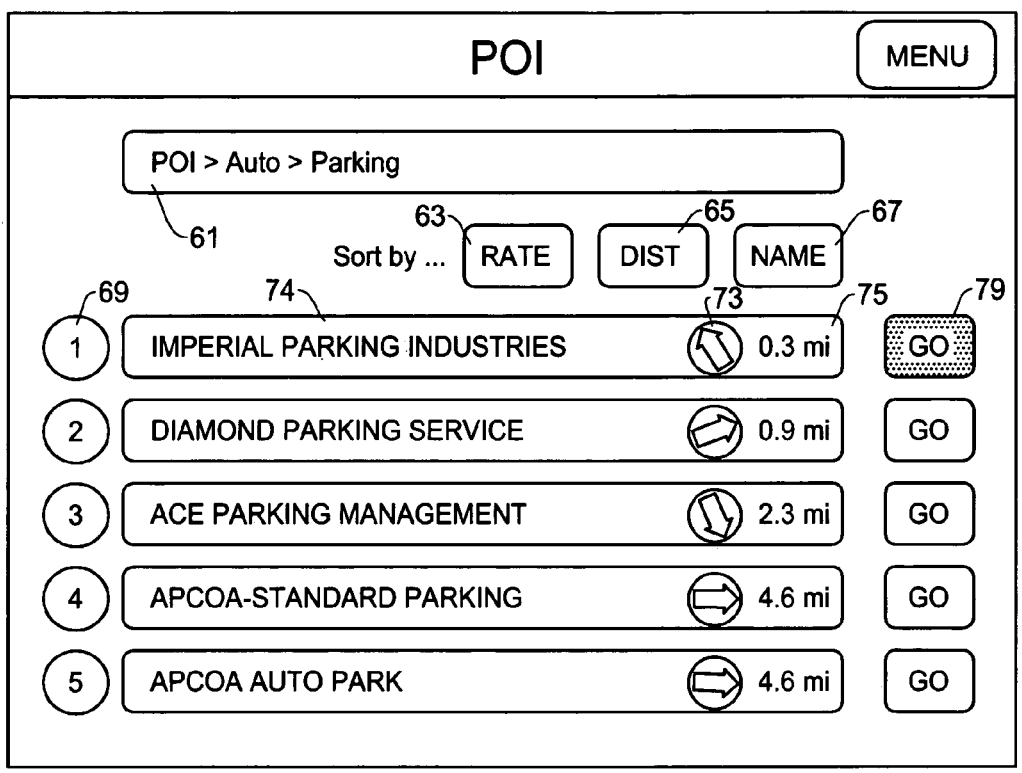
FIG. 10 is a schematic diagram showing an example of graphic display on the navigation system under the present invention that lists parking areas available at the destination or other selected location.

Through the parking information graphic user interface of FIGS. 4-8, when the user presses the parking button 84, the navigation system will display the list of parking POI information as shown in FIG. 10. The parking POI information screen has a list of parking areas available which are arranged in the order of distance or alphabet. In the example of FIG. 10, the parking areas are listed in the order of distance from the current vehicle position, where "Imperial Parking Industries" is closest to the current vehicle position and is listed first. The directions of the parking areas relative to the current vehicle position are indicated by arrow icons 73 in the parking POI list.

Approximate distances to the parking areas are also indicated by corresponding distance indicators 75 in the parking POI list. In the example of FIG. 10, an input field 61, a rate button 63, a distance button 65, and a name button 67 are used to arrange the order of the parking area entries. The input field 61 is used to input key words to search the POI, the rate button 63 is used to list the entries of parking areas in the order of parking price. The distance button 65 is used to list the entries of the parking area in the order of the distance from the current position, and the name button 67 is used to list the entries by an alphabetical order.

By pressing one of entries 74 in the list, the user is able to obtain the parking information for the selected parking area as described above with reference to FIGS. 4 to FIG. 8. The example of FIG. 10 also includes a "Go" button 79 for each entry of the parking area so that the user can select and press the button 79 next to the desired parking area for route guidance to the parking area. In response, the navigation system calculates an appropriate route to the selected parking area and starts the route guidance operation to the parking area.

Figure 11:
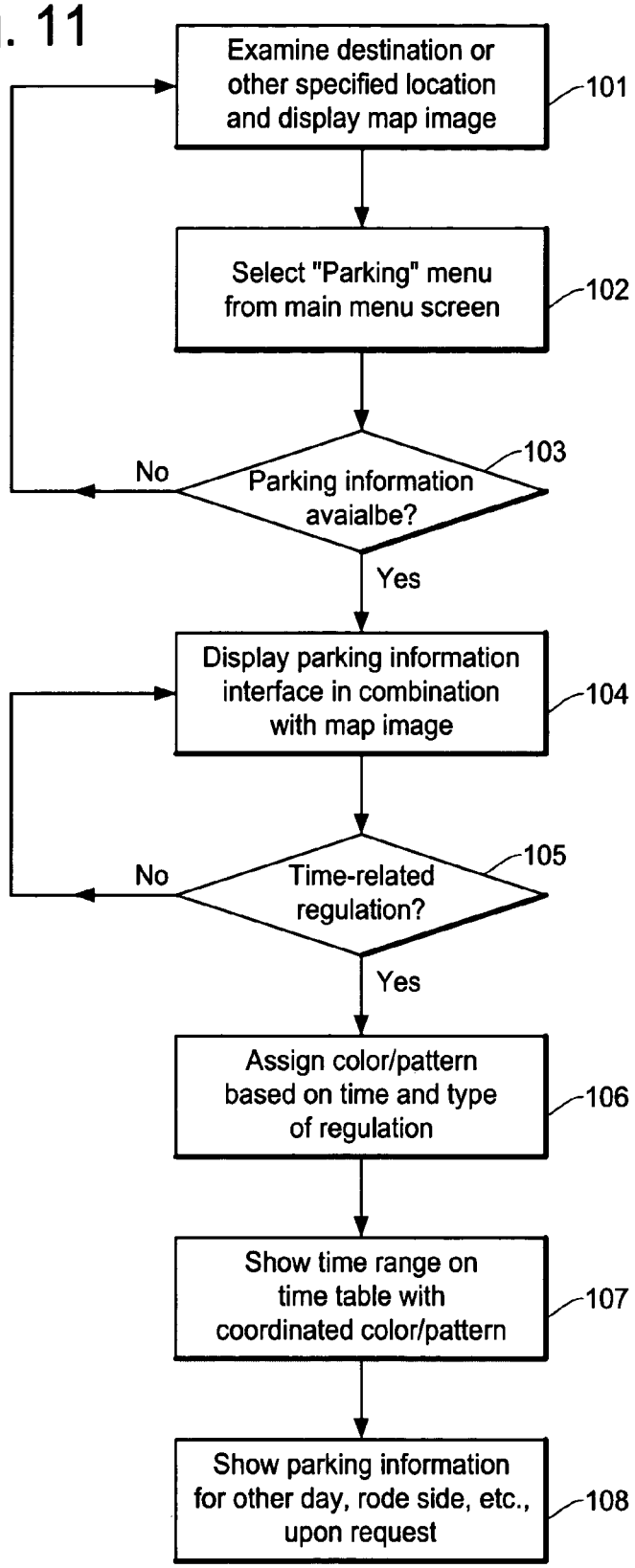
FIG. 11 is a flow chart showing a basic operational process involved in the parking information graphic interface method and apparatus under the present invention for a navigation system.

The basic steps of the parking information graphic user interface of the present invention are described with reference to the flow chart of FIG. 11. In the first step 101, the navigation system examines a location specified by the user which is typically a destination of the user's travel, a current vehicle position, or a location specified by a cursor point on the map image. Since the parking information graphic user interface of the present invention is operable at anytime, either during the route guidance operation or not, the parking information with respect to any location can be displayed as long as such information is readily available.

In the step 102, the navigation system accepts user's input that prompts the navigation system to display a screen of the parking information user interface. As noted above, this process is typically done by selecting the "Parking" menu through the main menu screen of FIG. 3. Then, in the step 103, the navigation system will check if the parking information with respect to the specified location is available. Such information may be provided in the map data stored in the data storage medium 131 (FIGS. 12 and 13) or through a remote service provider via a wired or wireless communication.

If the related parking information exists, the navigation system displays the screen of parking information graphic user interface shown in FIGS. 4-8 described above in the step 104. The parking information graphic user interface is a specially designed interface for showing the parking information and includes the street map, various menu keys, a time table, a time range indicator, etc. as noted above. If it is determined in the step 103 that no parking information is available for the specified location, the process returns to the step 101.

At the same time of displaying the parking information graphic user interface, the navigation system further checks whether the parking information includes time-related information in the step 105. If there is no time-related parking information, the navigation system simply so indicates and displays the general parking information obtained on the user interface in the step 104. If the parking information includes time-related information, the navigation system assigns a particular color/pattern to the time-related parking information in the step 106 to coordinate such information.

As noted above, by assigning the color and/or pattern to the icons and the time range indicators in the parking time table 81, the navigation system can present the parking information in the manner described above with reference to FIGS. 4-8. Thus, in the step 107, the navigation system displays the time range indicator on the time table as well as the text information and the icon related to the time range indicator on the user interface. In the step 108, in response to the request by the user made through the street side keys, days of week keys, etc., the navigation system displays the requested information on the parking information graphic user interface.

Figure 12:
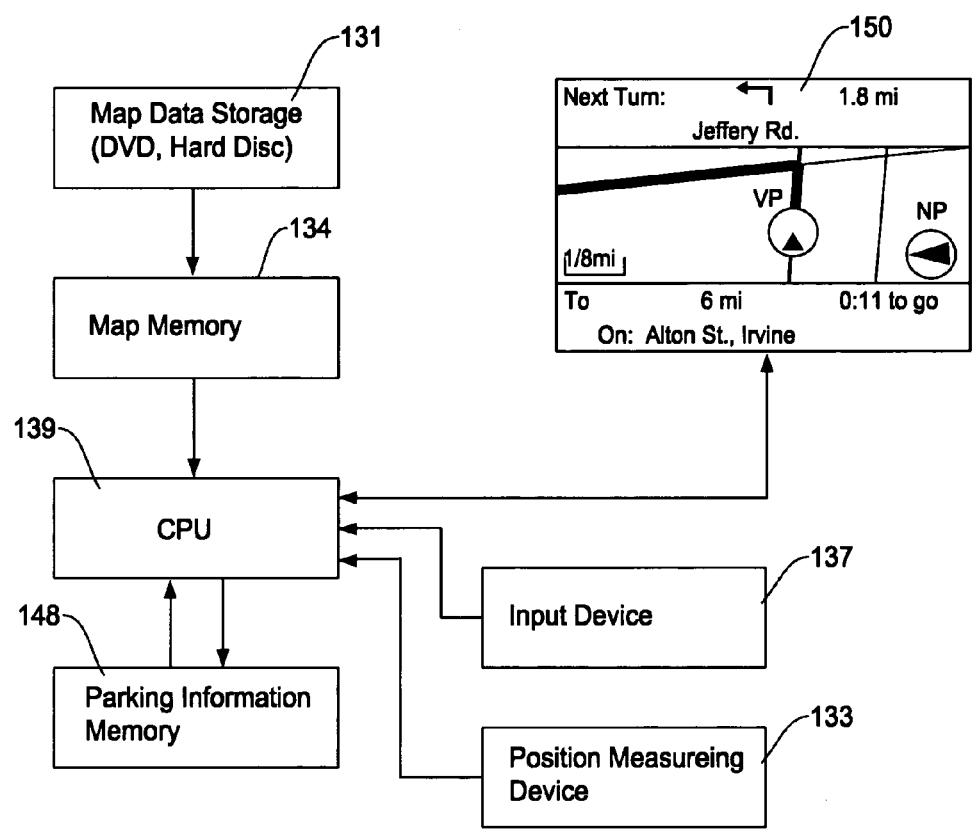
FIG. 12 is a functional block diagram showing an example of basic configuration of the parking information graphic interface apparatus of the present invention for a navigation system.

FIG. 12 is a functional block diagram showing an example of basic structure of the apparatus for implementing parking information graphic user interface of the present invention for the navigation system. The structure of FIG. 12 is applicable to any electronic device having a navigation function which enables the electronic device to guide the user to a particular location as noted above. The apparatus of the present invention for displaying the parking information graphic user interface includes a monitor 150 for displaying various screens related to the functions of the navigation system, and a controller (CPU) 139 for controlling an overall operation of the navigation system including the user interface of the present invention.

The block diagram of FIG. 12 further includes a map data storage (data storage medium) 131 such as a DVD or a hard disc for storing map data, a map memory 134 for storing a required portion of the map data retrieved from the map data storage 131, an input device 137 for the user to specify a destination, etc., such as a keypad or a remote controller, a position measuring device 133 for detecting a current position of the user and arrival at the destination, etc., for a route guidance operation, and a parking information memory 148 for storing the information concerning the parking at the destination or other specified location.

In FIG. 12, the apparatus of the present invention is able to retrieve the map data from the map data storage 131 and map memory 134 for establishing a calculated route to the destination which is specified through the input device 137. Based on the retrieved map data, the apparatus displays the map image on the monitor 150 that includes the calculated route which is highlighted during the route guidance operation. If the apparatus implementing the present invention has a communication capability either through wire or wireless, such map data can be retrieved from a remote data server. Further, the parking information concerning the destination, etc, can be retrieved from the map data storage 131 or from a remote service provider and stored in the parking information memory 148.

The CPU 139 controls an overall operation of establishing the calculated route, conducting the route guidance operation, and displaying the parking information through the specially designed graphic user interface of the present invention. As soon as the destination is specified by the user through the operation of the input device 137, etc., the CPU 139 retrieves the map data from the map data storage 131 and the map memory 134 to establish a calculated route to the destination. The CPU 139 controls the route guidance operation to guide the user to the destination along the calculated route.

When the user selects the "Parking" menu through the main menu screen of FIG. 3, the CPU 139 checks if the parking information with respect to the destination or other specified location is available. If the related parking information exists, the CPU 139 controls to display the screen of parking information graphic user interface shown in FIGS.

4-8. As noted above, the parking information graphic user interface is a specially designed interface for showing the parking information and includes the street map, various menu keys, a time table, a time range indicator, etc. as noted above.

If the parking information includes time-related information, the CPU 139 assigns a particular color/pattern to the time-related parking information to coordinate such information. As noted above, by assigning the color and/or pattern to the icons and the time range indicators in the parking time table 81, the navigation system can present the parking information in the manner described above with reference to FIGS. 4-8. Thus, the CPU 139 displays the time range indicator on the time table as well as the text information and the icon related to the time range indicator on the user interface. In response to the request by the user made through the street side keys, days of week keys, etc., on the user interface, the CPU 139 controls to display the requested information on the screen.

FIG. 13 shows an embodiment of the structure of a vehicle navigation system for implementing the present invention. While the vehicle navigation system is explained for an illustration purpose, the present invention can also be applied to other types of navigation system, such as a portable navigation device implemented by a PDA (personal digital assistant) device, other hand-held devices such as a wireless telephone, or a laptop or notebook computer.

In the block diagram of FIG. 13, the functional blocks similar to those of FIG. 12 are denoted by the same reference numerals. The vehicle navigation system includes a data storage medium 131 such as a hard disc, CD-ROM, DVD or other storage means for storing the map data. The navigation system includes a control unit 132 for controlling an operation for reading the information from the data storage medium 131, and a position measuring device 133 for measuring the present vehicle position or user position. For example, the position measuring device 133 has a vehicle speed sensor for detecting a moving distance, a gyroscope for detecting a moving direction, a microprocessor for calculating a position, a GPS (global positioning system) receiver for receiving and analyzing GPS signals, and etc.

The block diagram of FIG. 13 further includes a map information memory 134 for storing a portion of the map data relevant to the intended operation of the navigation system which is read from the data storage medium 131, a database memory 135 for storing database information such as point of interest (POI) information which is read out from the data storage medium 131, a remote controller 137 for executing a menu selection operation, cursor movements, an enlarge/reduce operation, a destination input operation, etc. and a remote controller interface 138. Although a remote controller is a typical example for selecting menus, executing selected functions and etc., the navigation system includes various other input methods to achieve the same and similar operations done through the remote controller.

In FIG. 13, the navigation system further includes a bus 136 for interfacing the above functional blocks in the system, a processor (CPU) 139 for controlling an overall operation of the navigation system including the parking information graphic user interface, a ROM 140 for storing various control programs such as a route search program and a map matching program necessary for navigation control as well as a local brand icon display program for the present invention, a RAM 141 for storing a processing result such as a guide route, a display controller 143 for generating map image (a map guide image and an arrow guide image) on the basis of the map information, a VRAM 144 for storing images generated by the display controller 143, a menu/list generating unit 145 for generating menu image/various list images, and a synthesizing unit 146.

The block diagram of FIG. 13 further includes a wireless transceiver 149 for wireless communication to retrieve data such as parking information from a remote service provider, a parking information memory 148 for storing data such as parking information retrieved from the data storage medium 131 or the remote service provider and reading out such information for use with the graphic user interface of the present invention.

The CPU 139 controls an overall operation of the navigation system including the parking information graphic user interface under the present invention for efficiently and intuitively providing parking information to the user. A program that performs the procedure of the present invention including the one shown in the flow chart of FIG. 11 may be stored in the ROM 140 or other storage medium and is executed by the CPU 139. As noted above, the memory 148 may be used for storing the parking information related to the destination or other specified location. The information regarding parking fees and parking restrictions may change frequently, and in order to keep the parking information up to date, the wireless transceiver 149 may be used to retrieve the updated parking information.

As has been described above, according to the present invention, the navigation system is able to efficiently and intuitively provide parking information to the user through the parking information graphic user interface. The parking information graphic user interface includes a time table with a time range indicator, text messages, road side selection keys, days of week keys, etc., where colors and patterns used in the user interface are coordinated with one another so that the parking information is displayed in an easily and intuitively understandable manner. Since the user is able to obtain the detailed parking information in advance, the user can be well informed about the parking spaces before reaching the destination. Further, since the user is able to obtain the detailed parking information at any specified location at any time, the user can have sufficient knowledge and select a desired parking location and parking time.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A parking information graphic interface method for a navigation system, comprising the following steps of:
   specifying a location by a user;
   examining the location specified by the user for retrieving data associated with the specified location from a data storage medium;
   receiving request for parking information by the user;
   displaying a screen of parking information graphic interface upon request by the user; and
   examining whether there is a time-related parking restriction on the specified location and retrieving the time-related parking information if any;
   wherein the parking information graphic interface illustrates a map image, a time table of a day, a time range indicator on the time table, and a text message regarding the time-related parking restriction, thereby graphically displaying the parking information on the specified location, and;

wherein said parking information graphic interface further illustrates road side selection keys thereon to prompt the user to select a desired road side to display the parking information on the specified location regarding the selected road side.

2. A parking information graphic interface method as defined in claim 1, wherein said text message regarding the time-related parking restriction is identified by an icon where a color or pattern of the icon is coordinated with that of the time range indicator.

3. A parking information graphic interface method as defined in claim 1, wherein two or more time range indicators are displayed on the time table when there are two or more time-related parking restrictions to indicate time lengths that the corresponding parking restrictions apply, and two or more text messages regarding the corresponding time-related parking restrictions are identified by two more icons where colors or patterns of the icons are coordinated with those of the time range indicators.

4. A parking information graphic interface method as defined in claim 1, wherein said parking information graphic interface further illustrates selection keys thereon to prompt the user to select a desired day of a week to display the parking information on the specified location regarding the selected day.

5. A parking information graphic interface method as defined in claim 1, wherein said map image on the parking information graphic interface covers an area including the specified location on which a parking area at the specified location or a parking area on the selected road side at the specified location is highlighted.

6. A parking information graphic interface method as defined in claim 1, wherein said specified location is either a destination of travel, a current position of a vehicle of the user, or any position on the map image specified by a cursor point.

7. A parking information graphic interface method as defined in claim 1, wherein said text message on the parking information graphic interface indicates that there is no parking restriction when there is no time-related parking restriction regarding the specified location.

8. A parking information graphic interface method as defined in claim 1, wherein said parking information graphic interface further illustrates a parking button thereon to find parking areas close to the specified location when the user activates the parking button.

9. A parking information graphic interface method as defined in claim 8, wherein said parking information graphic interface displays a list of parking areas close to the specified location when the user activates the parking button where the parking areas are listed in an order of distance from the specified location, an order of alphabet, or an order of price range.

10. A parking information graphic interface apparatus for a navigation system, comprising:
    means for examining a location specified by a user;
    means for retrieving data associated with the specified location from a data storage medium;
    means for displaying a screen of parking information graphic interface upon request by the user; and
    means for examining whether there is a time-related parking restriction on the specified location and retrieving the time-related parking information if any;
    wherein the parking information graphic interface illustrates a map image, a time table of a day, a time range indicator on the time table, and a text message regarding the time-related parking restriction, thereby graphically displaying the parking information on the specified location, and;
    wherein said parking information graphic interface further illustrates road side selection keys thereon to prompt the user to select a desired road side to display the parking information on the specified location regarding the selected road side.

11. A parking information graphic interface apparatus as defined in claim 10, wherein said text message regarding the time-related parking restriction is identified by an icon where a color or pattern of the icon is coordinated with that of the time range indicator.

12. A parking information graphic interface apparatus as defined in claim 10, wherein two or more time range indicators are displayed on the time table when there are two or more time-related parking restrictions to indicate time lengths that the corresponding parking restrictions apply, and two or more text messages regarding the corresponding time-related parking restrictions are identified by two more icons where colors or patterns of the icons are coordinated with those of the time range indicators.

13. A parking information graphic interface apparatus as defined in claim 10, wherein said parking information graphic interface further illustrates selection keys thereon to prompt the user to select a desired day of a week to display the parking information on the specified location regarding the selected day.

14. A parking information graphic interface apparatus as defined in claim 10, wherein said map image on the parking information graphic interface covers an area including the specified location on which a parking area at the specified location or a parking area on the selected road side at the specified location is highlighted.

15. A parking information graphic interface apparatus as defined in claim 10, wherein said specified location is either a destination of travel, a current position of a vehicle of the user, or any position on the map image specified by a cursor point.

16. A parking information graphic interface apparatus as defined in claim 10, wherein said text message on the parking information graphic interface indicates that there is no parking restriction when there is no time-related parking restriction regarding the specified location.

17. A parking information graphic interface apparatus as defined in claim 10, wherein said parking information graphic interface further illustrates a parking button thereon to find parking areas close to the specified location when the user activates the parking button.

18. A parking information graphic interface apparatus as defined in claim 17, wherein said parking information graphic interface displays a list of parking areas close to the specified location when the user activates the parking button where the parking areas are listed in an order of distance from the specified location, an order of alphabet, or an order of price range.

* * * * *